United States Patent
Birang et al.

[11] Patent Number: 5,989,103
[45] Date of Patent: Nov. 23, 1999

[54] MAGNETIC CARRIER HEAD FOR CHEMICAL MECHANICAL POLISHING

[75] Inventors: Manoocher Birang; John Prince, both of Los Gatos; James Nystrom, Palo Alto, all of Calif.

[73] Assignee: Applied Materials, Inc., Santa Clara, Calif.

[21] Appl. No.: 08/933,815

[22] Filed: Sep. 19, 1997

[51] Int. Cl.⁶ .................................................... B24B 1/00
[52] U.S. Cl. ........................ 451/41; 451/288; 451/364; 451/388; 451/494; 451/285
[58] Field of Search .................... 451/285–289, 451/398, 364, 388, 494, 41; 269/8, 329, 224, 172; 229/128; 409/231

[56] References Cited

U.S. PATENT DOCUMENTS

| | | | |
|---|---|---|---|
| 1,665,226 | 4/1928 | Simmons | 451/364 |
| 2,443,733 | 6/1948 | Karge | 451/364 |
| 2,474,800 | 6/1949 | Nill | 451/364 |
| 4,222,204 | 9/1980 | Benner | 451/494 |
| 4,270,314 | 6/1981 | Cesna . | |
| 4,873,792 | 10/1989 | Linke et al. . | |
| 4,941,245 | 7/1990 | Yamashita et al. | 279/128 |
| 5,205,082 | 4/1993 | Shendon et al. . | |
| 5,357,717 | 10/1997 | Friel et al. | 451/494 |
| 5,398,459 | 3/1995 | Okumura et al. . | |
| 5,441,444 | 8/1995 | Nakajima . | |
| 5,443,416 | 8/1995 | Volodarsky et al. . | |
| 5,498,199 | 3/1996 | Karlsrud et al. . | |
| 5,624,299 | 4/1997 | Shendon . | |
| 5,643,053 | 7/1997 | Shendon . | |
| 5,681,215 | 10/1997 | Sherwood et al. . | |
| 5,732,938 | 3/1998 | Rajanathan et al. | 269/216 |
| 5,828,224 | 10/1998 | Maruyama | 269/8 |

FOREIGN PATENT DOCUMENTS

| | | |
|---|---|---|
| 0 786 310 A1 | 7/1997 | European Pat. Off. . |
| 41 19 752 A1 | 12/1992 | Germany . |
| 42 00 365 A1 | 7/1993 | Germany . |
| 44 44 496 A1 | 6/1996 | Germany . |
| 63-312037 | 12/1988 | Japan . |
| 404010553 | 1/1992 | Japan ........................ 279/128 |

*Primary Examiner*—Robert A. Rose
*Assistant Examiner*—George Nguyen
*Attorney, Agent, or Firm*—Fish & Richardson

[57] ABSTRACT

A carrier head assembly including a drive shaft and a system flange connectable to the drive shaft where the system flange includes a number of magnetic plates. The carrier head assembly also includes a carrier head flange. The carrier head flange has more magnetic plates, these magnetic plates generally facing the previous plates. The magnetic plates magnetically engage to couple the carrier head flange to the system flange.

22 Claims, 8 Drawing Sheets

MAGNETIC CARRIER HEAD FOR CHEMICAL MECHANICAL POLISHING

BACKGROUND

1. Technical Field

This invention relates to a magnetic carrier head for chemical mechanical polishing, and more particularly to a carrier head attached by magnetic forces to a chemical mechanical polishing apparatus.

2. Background Information

Integrated circuits typically are formed on semiconductive substrates, particularly silicon wafers, by the sequential deposition of conductive, semiconductive, or insulative layers. After each layer is deposited, the layer is etched to create circuitry features. As a series of layers is sequentially deposited and etched, the outer surface of the substrate, i.e., the exposed surface of the of the top layer on the substrate, becomes successively more non-planar as a result of peaks and valleys which are formed by the selective etching. This non-planar outer surface presents a problem for the integrated circuit manufacturer. If the outer surface of the substrate is non-planar, then a photoresist layer placed thereon also is non-planar.

A photoresist layer may be placed on the substrate as a step of an etching process. The photoresist layer typically is patterned by a photolithographic apparatus that focuses a light image onto the photoresist layer. If the outer surface of the substrate is sufficiently non-planar, then the maximum height difference between the peaks and valleys of the outer surface may exceed the depth of focus of the imaging apparatus. Consequently, properly focusing the light image onto the entire outer surface becomes difficult if not impossible.

Designing new photolithographic devices having an improved depth of focus may be prohibitively expensive. In addition, as the feature size used in integrated circuits becomes smaller, shorter wavelengths of light must be used, resulting in further reduction of the available depth of focus. Therefore, a need exists to planarize (i.e., make smooth) the substrate surface periodically to provide a planar layer surface.

Chemical mechanical polishing (CMP) is one method of planarization. This planarization method typically requires that the substrate be mounted on a carrier or polishing head. The exposed surface of the substrate is then placed against a rotating polishing pad. The carrier head applies a controllable load, i.e., pressure, on the substrate to push it against the polishing pad. In addition, the carrier head may rotate to provide additional motion between the substrate and polishing surface.

A polishing slurry, including an abrasive and at least one chemically-reactive agent, may be distributed over the polishing pad to provide an abrasive chemical solution at the interface between the pad and substrate. CMP is a fairly complex process. In a CMP process, the reactive agent in the slurry reacts with the outer surface of the substrate to form reactive sites. The interaction of the polishing pad and abrasive particles with reactive sites on the substrate results in polishing.

The carrier head performs several mechanical functions in the CMP process. Generally, the carrier head holds the substrate against the polishing pad, evenly distributes a downward pressure across the back surface of the substrate, transfers torque from the drive shaft to the substrate, and ensures that the substrate does not slip out from beneath the carrier head during polishing operations. If the carrier head consistently fails to perform any of these functions, it often must be repaired. A first step in many repair procedures is the removal of the carrier head from the rest of the system.

SUMMARY

In one aspect, a carrier head assembly is provided which includes a system flange connectable to a drive shaft. The assembly has a first plurality of magnetic plates. The assembly also includes a carrier head flange having a second plurality of magnetic plates, the second plurality of magnetic plates generally facing the first plurality of magnetic plates. The second plurality of magnetic plates magnetically engages the first plurality of magnetic plates to magnetically couple the carrier head flange to the system flange.

Implementations may include one or more of the following. The carrier head assembly may further comprise a plurality of shunts mounted to the carrier head flange or to the system flange. In this way, when the carrier head flange is rotated relative to the flange, either the first or the second plurality of magnetic plates magnetically engages the plurality of shunts to form a magnetic circuit such that the system flange is magnetically decoupled from the carrier head flange. The number of shunts may be equal to the number of first or second magnetic plates. The number of such plates and shunts may be eight. Each of the first and second plurality of magnetic plates may be made of a partially soft magnetic material such as samarium-cobalt, neodymium-iron-boron, or nickel cobalt. Each of the first plurality of magnetic plates may have a radial direction of magnetization opposite to that of its neighboring magnetic plates.

In another aspect, a carrier head assembly is provided which includes a drive shaft. The assembly further includes a system flange connected to and approximately concentric with the drive shaft. The system flange has a first plurality of magnetic plates arranged in an approximately circular manner. The assembly also includes a carrier head flange having a second plurality of magnetic plates, the second plurality of magnetic plates generally facing the first plurality of magnetic plates. The second plurality of magnetic plates further includes an inner plurality of magnetic plates and an outer plurality of magnetic plates, the inner and outer pluralities of magnetic plates being equal in number. Each of the inner plurality of magnetic plates is radially separated from a corresponding one of the outer plurality of magnetic plates such that the second plurality of magnetic plates magnetically engages the first plurality of magnetic plates to magnetically couple the carrier head flange to the system flange.

In another aspect, a carrier head assembly is provided which includes a drive shaft. A system flange is connected to and is approximately concentric with the drive shaft. The magnetic plate system is as above, and breaks occur between each magnetic plate and the circumferentially neighboring magnetic plates.

In another variation, when each of the first plurality of magnetic plates is co-radial with a break, the upper housing section is magnetically decoupled from the carrier head flange.

Advantages of the invention may include one or more of the following. Carrier heads may be removed and replaced easily because removal of a carrier head involves rotating the head only by a few degrees. Minimal space is required to hold the carrier head onto the drive shaft, and minimal angular displacement is required to unlock and remove the carrier head from the drive shaft. A stable configuration is realized by the use of a return spring to ensure locking within a normally locked design. No tools are required for mounting or dismounting the carrier head from the drive shaft.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
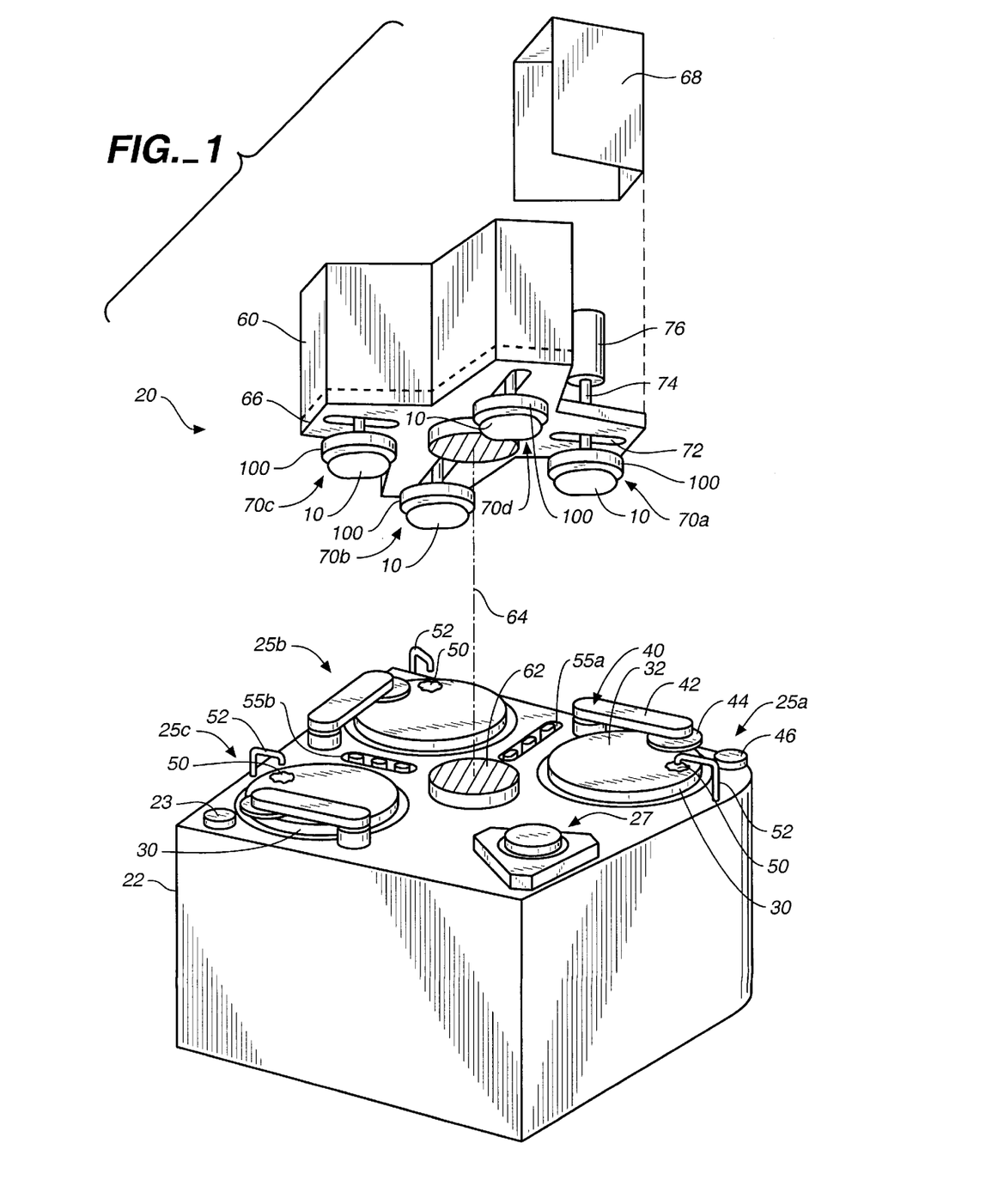
FIG. 1 is an schematic exploded perspective view of a chemical mechanical polishing apparatus.

Referring to FIG. 1, one or more substrates 10 can be polished by a chemical mechanical polishing apparatus 20, which includes a lower machine base 22 with a table top 23 mounted thereon and removable upper outer cover (not shown). Table top 23 supports a series of polishing stations 25a, 25b, and 25c, and a transfer station 27. Transfer station 27 forms a generally square arrangement with the three polishing stations 25a, 25b and 25c. Transfer station 27 serves multiple functions of receiving individual substrates 10 from a loading apparatus (not shown), washing the substrates, loading the substrates into carrier heads, receiving the substrates from the carrier heads, washing the substrates again, and finally transferring the substrates back to the loading apparatus. The carrier heads are described in more detail below, and in U.S. patent applications Ser. No. 08/549,651, entitled "Carrier Head Design for a Chemical Mechanical Polishing Apparatus," filed Oct. 27, 1995, and Ser. No. 08/549,336, entitled "Continuous Processing System for Chemical Mechanical Polishing," filed Oct. 27, 1995, both of which are assigned to the assignee of the present application, and which are incorporated herein by reference in their entirety.

Each polishing station 25a–25c includes a rotatable platen 30 on which a polishing pad 32 is placed. If substrate 10 is, for example, an eight-inch (200 mm) diameter disk, then platen 30 and polishing pad 32 will be about twenty inches in diameter. Platen 30 is a rotatable aluminum or stainless steel plate connected by a stainless steel platen drive shaft (not shown) to a platen drive motor (not shown). For most polishing processes, the drive motor rotates platen 30 at 30 to 200 revolutions per minute, although lower or higher rotational speeds may be used.

Each polishing station 25a–25c may further include an associated pad conditioner apparatus 40. Each pad conditioner apparatus 40 has a rotatable arm 42 holding an independently rotating conditioner head 44 and an associated washing basin 46. The conditioner apparatus maintains the condition of the polishing pad so that the polishing pad maintains effectiveness in substrate polishing.

A slurry 50 containing a reactive agent (e.g., deionized water for oxide polishing), abrasive particles (e.g., silicon dioxide for oxide polishing) and a chemically-reactive catalyzer (e.g., potassium hydroxide for oxide polishing) is supplied to the surface of polishing pad 32 by a slurry supply tube 52. Sufficient slurry is provided to cover and wet the entire polishing pad 32. Two or more intermediate washing stations 55a and 55b are positioned between neighboring polishing stations 25a, 25b and 25c. The washing stations rinse the substrates as they pass from one polishing station to another.

A rotatable multi-head carousel 60 is positioned above lower machine base 22. Carousel 60 is supported by a center post 62 and rotated thereon about a carousel axis 64 by a carousel motor assembly located within base 22. Center post 62 supports a carousel support plate 66 and a cover 68. Multi-head carousel 60 includes four carrier head systems 70a, 70b, 70c, and 70d. Three of the carrier head systems receive and hold substrates, and polish them by pressing the substrates against the polishing pad 32 on platen 30 of polishing stations 25a–25c. One of the carrier head systems receives a substrate from, and delivers the substrate to, transfer station 27.

The four carrier head systems 70a–70d may be mounted on carousel support plate 66 at equal angular intervals about carousel axis 64. Center post 62 allows the carousel motor to rotate the carousel support plate 66 and to revolve the carrier head systems 70a–70d, and the substrates attached thereto, about carousel axis 64.

Each carrier head system 70a–70d includes a polishing or carrier head 100, which will be described in more detail below. Each carrier head 100 independently rotates about its own axis, and independently laterally oscillates in a radial slot 72 formed in carousel support plate 66. A carrier drive shaft 74 connects a carrier head rotation motor 76 to carrier head 100 (shown by the removal of one-quarter of cover 68). Each head has one carrier drive shaft and one motor.

Figure 2:
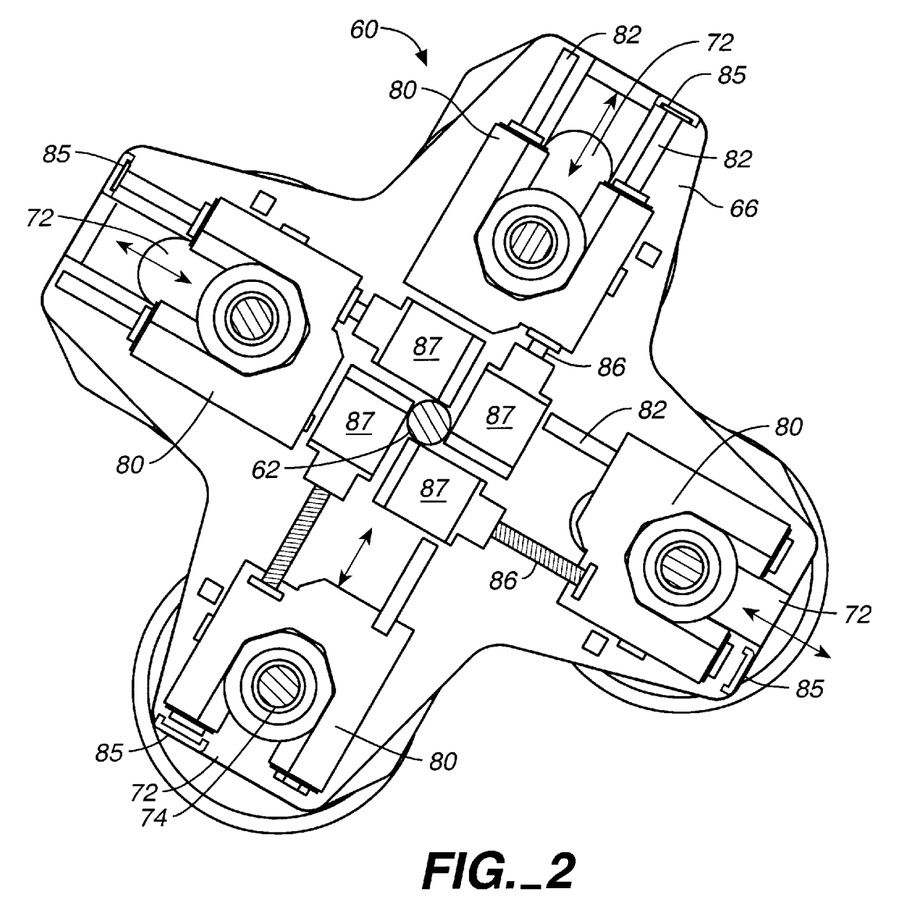
FIG. 2 is a schematic top view of a carousel, with the upper housing removed.

Referring to FIG. 2, in which cover 68 of carousel 60 has been removed, carousel support plate 66 supports the four carrier head systems 70a–70d. Carousel support plate 66 includes four radial slots 72, generally extending radially and oriented 90° apart. Radial slots 72 either may be close-ended (as shown) or open-ended. The top of support plate 66 supports four slotted carrier head support slides 80.

Each slide 80 aligns along one of the radial slots 72 and moves freely along a radial path with respect to carousel support plate 66. Two linear bearing assemblies bracket each radial slot 72 to support each slide 80.

Figure 3:
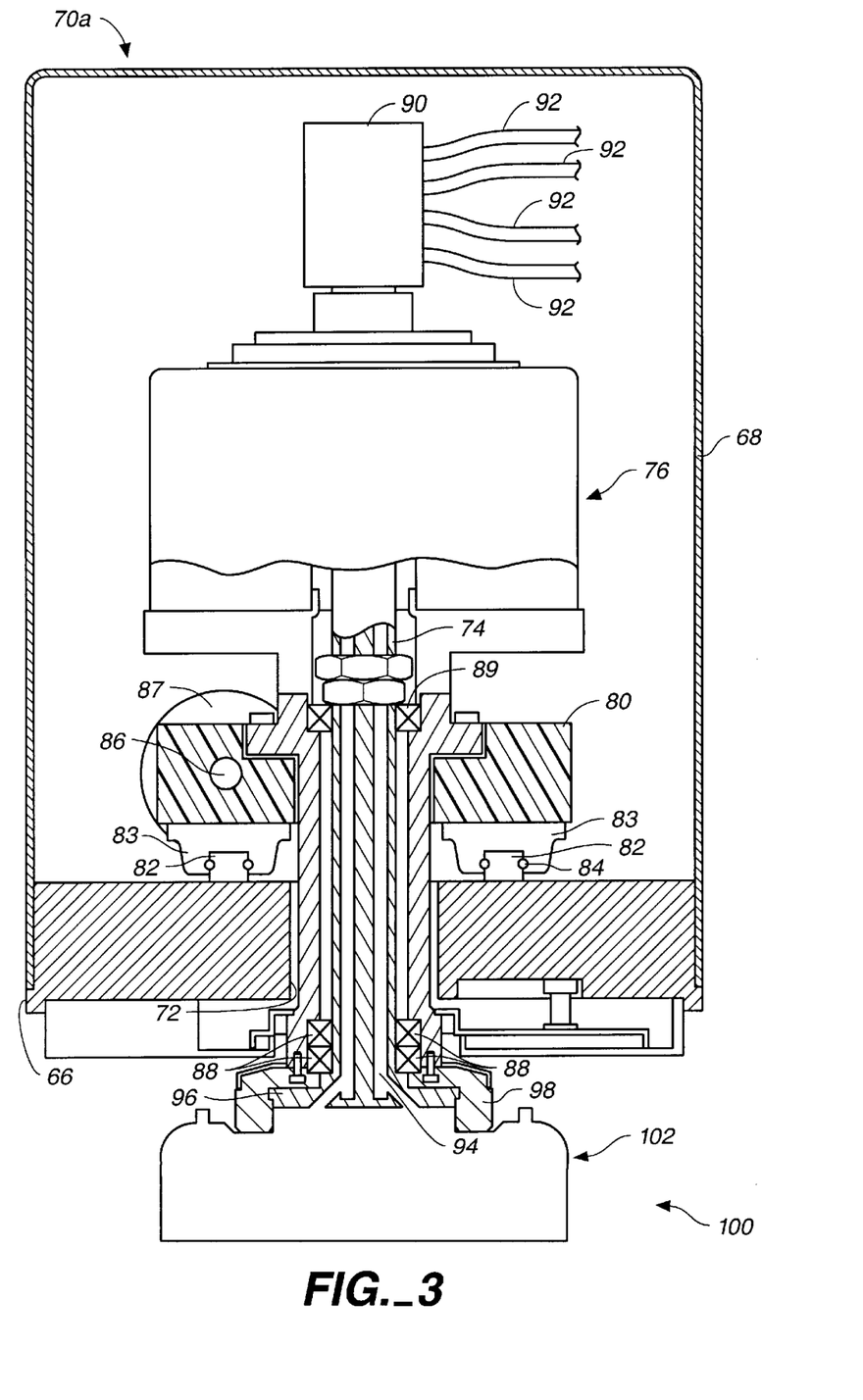
FIG. 3 is a schematic cross-sectional view of a carrier head—drive shaft system.

As shown in FIGS. 2 and 3, each linear bearing assembly includes rails 82 fixed to carousel support plate 66, and two hands 83 fixed to slide 80 to grasp each rail. Two bearings 84 separate each hand 83 from rail 82 to provide free and smooth movement therebetween. Thus, the linear bearing assemblies permit the slides 80 to move freely along radial slots 72.

A bearing stop 85 anchored to the outer end of one of rails 82 prevents slide 80 from coming off the end of rails 82 accidentally. One of the arms of each slide 80 contains an unillustrated threaded receiving cavity or nut fixed to the slide near its distal end. The threaded cavity or nut receives a worm-gear lead screw 86 driven by a slide radial oscillator motor 87 mounted on carousel support plate 66. When motor 87 turns lead screw 86, slide 80 moves radially. The four motors 87 are independently operable to independently move the four slides along the radial slots 72 in carousel support plate 66.

Referring in particular to FIG. 3, a carrier head assembly, each including a carrier head 100, a carrier drive shaft 74, carrier motor 76, and a surrounding non-rotating shaft housing is fixed to each of the four slides. The drive shaft housing holds drive shaft 74 by paired sets of lower ring bearings 88 and a set of upper ring bearings 89. Each carrier head assembly can be assembled away from polishing apparatus 20, slid in an untightened state into radial slot 72 in carousel support plate 66 and between the arms of slide 80, and there tightened to grasp the slide.

A rotary coupling 90 at the top of motor 76 couples four fluid or electrical lines 92 into four channels 94 in drive shaft 74. Channels 94 are used to pneumatically power carrier head 100, to vacuum-chuck the substrate to the bottom of the carrier head and to actuate a retaining ring against the polishing pad. As described in more detail below, a flange 98 is used to connect drive shaft 74 to carrier head 100. Flange 98 may be approximately concentric with drive shaft 74.

Returning to FIG. 1, the substrates attached to the bottom of carrier heads 100 may be raised or lowered by the carrier head systems 70*a*–70*d*. An advantage of the overall carousel system is that only a short vertical stroke is required of the polishing head systems to accept substrates, and to position them for polishing and washing. The carrier head is vertically fixed relative to the surface of the polishing pad by a support member such as drive shaft 74. An input control signal (e.g., a pneumatic, hydraulic, or electrical signal), causes expansion or contraction of carrier head 100 of the polishing head systems in order to accommodate any required vertical stroke. Specifically, the input control signal causes a lower carrier head member having a substrate receiving surface to move vertically relative to a stationary upper carrier head member.

During polishing, three of the carrier heads, e.g., those of polishing head systems 70*a*–70*c*, are positioned at and above respective polishing stations 25*a*–25*c*. Carrier head 100 lowers a substrate to contact polishing pad 32, and slurry 50 acts as the media for chemical mechanical polishing of the substrate or wafer. The carrier head 100 uniformly loads the substrate against the polishing pad. For the main polishing step, usually performed at station 25*a*, carrier head 100 applies a force to substrate 10 of approximately four to ten pounds per square inch (psi). At subsequent stations, carrier head 100 may apply more or less force. For example, for a final polishing step, usually performed at station 25*c*, carrier head 100 applies about three psi. Carrier motor 76 rotates carrier head 100 at about 30 to 200 revolutions per minute. Platen 30 and carrier head 100 may rotate at substantially the same rate.

In these steps, carrier head 100 must hold the substrate against polishing pad 32, evenly distribute a downward pressure across the back surface of the substrate, transfer torque from drive shaft 74 to the substrate, and prevent the substrate from slipping out from beneath carrier head 100 during polishing operations.

If carrier head 100 breaks down, one or more of these functions may not be performed or may be performed inadequately. Generally, the affected carrier head must be removed, repaired and replaced.

Figure 4:
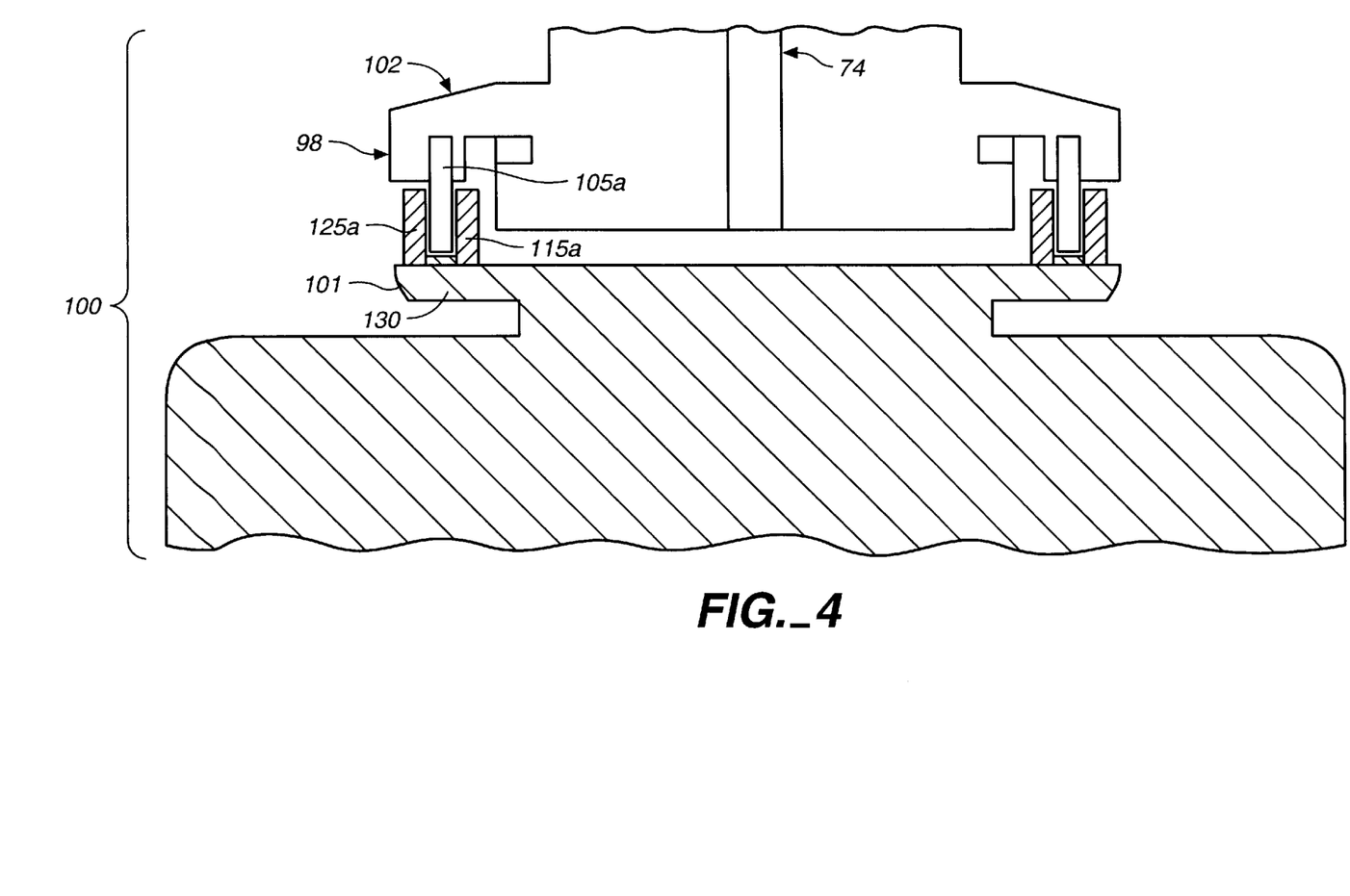
FIG. 4 is a schematic cross-sectional view of a portion of a carrier head.

As shown in FIG. 4, a carrier head 100 is connected to drive shaft 74 by housing 102. Housing 102 is generally circular in configuration so as to match the circular shape of the substrate to be polished. Housing 102 has a system flange 98 connected to drive shaft 74 and a carrier head flange 101 connected to the top of the carrier head. System flange 98 has a first plurality of magnetic plates 105 which may be spaced in an approximately circular manner around its circumference or otherwise. FIG. 4 shows the details only for plates 105*a*, 115*a*, and 125*a*. These plates are discussed below.

Figure 5:
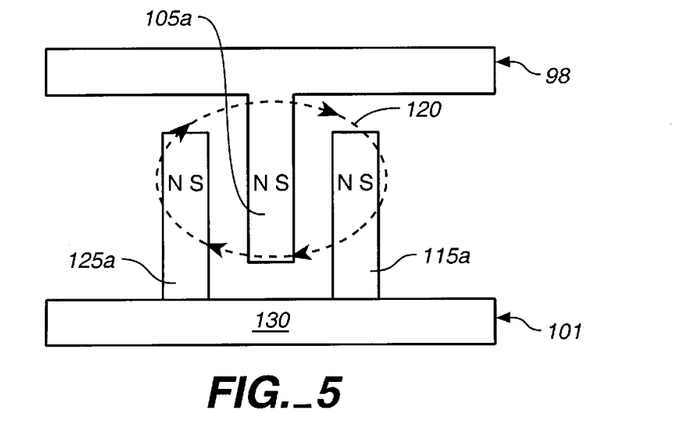
FIG. 5 is a cross-sectional view of a magnetic plate system.

Carrier head flange 101 has a second plurality of magnetic plates mounted upright on an annulus 130 which may be spaced in an approximately circular manner. The second plurality of magnetic plates generally face the first plurality of magnetic plates. This second plurality of magnetic plates comprises an inner plurality of magnetic plates 115 and an outer plurality of magnetic plates 125. Each plate of the inner plurality 115*a* may be radially separated from a corresponding outer plate 125*a*. Note that "*a*" is used here as an index—if eight first plurality plates are used they may be denoted 105*a* through 105*h*. Depending on the context, however, an element number alone may also refer to a single plate or to a plurality of plates. Annulus 130 can be made of, for example, steel. Each outer plate 125*a* corresponds to an inner plate 115*a* such that a radial line extending from the center of annulus 130 that intersects outer plate 125*a* also generally will intersect the corresponding inner plate 115*a*. Referring to FIG. 5, inner plate 115, outer plate 125, and annulus 130 form a "U"-shape when viewed in cross-section.

Figure 6:
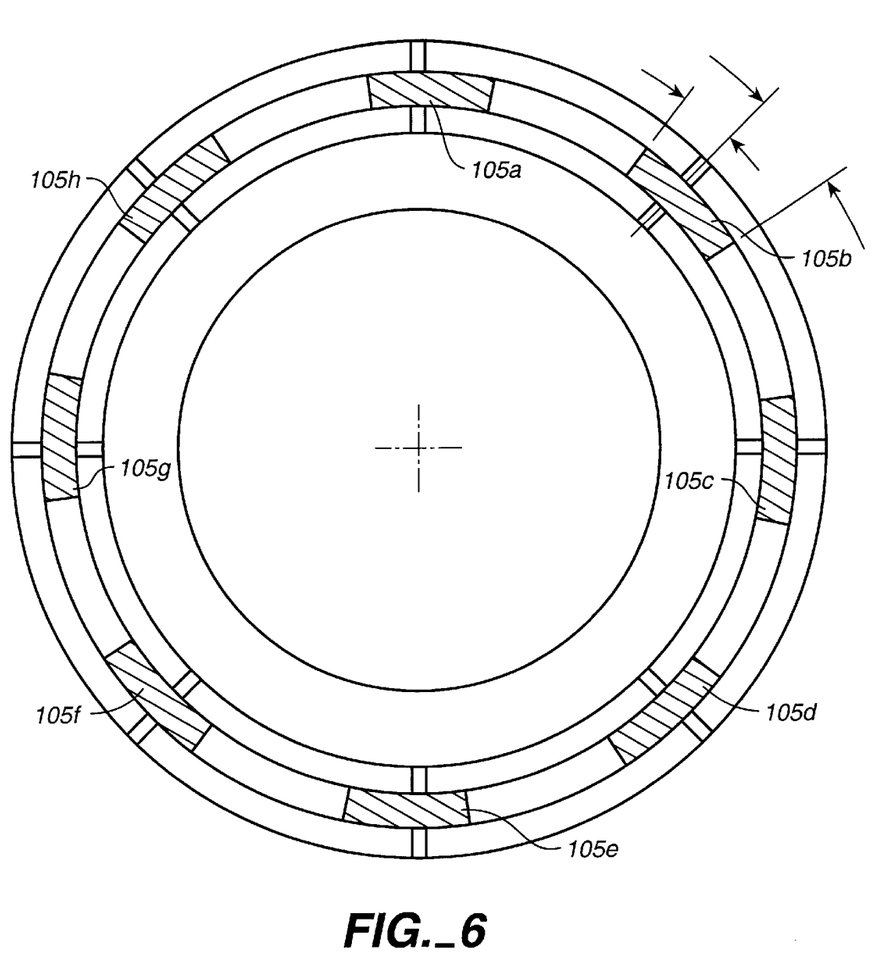
FIG. 6 is a bottom plan view of an upper section of a carrier head.

As mentioned above, system flange 98 has a first plurality of magnetic plates 105*a* spaced around its circumference. FIG. 4 shows, in part, a magnetic plate 105*a* of the first plurality. The number of such plates may range between 4 and 12 depending on the application, the weight of the carrier head, and the type of magnetic material used. Acceptable results have been found if eight plates 105 are used. This particular embodiment is shown in a bottom plan view in FIG. 6. Generally, the number of plates 105 is even and is the same as the number of inner plates 115, which, in turn, is the same as the number of outer plurality plates 125. However, having a matching number of plates is not necessary. For example, each outer plate may correspond to two inner plates. Other such combinations also are possible. The dimension of the magnetic plates along the arc of the circumference of annulus 130 may be, for example, between 0.5 and 1 inch. The radial dimension of the magnetic plates, i.e., their thickness, may be about 0.2 inches. The remaining dimension, the magnetic plates' height, may be about 1 inch.

The composition of any or all of the magnetic plates may be, for example, partially soft magnetic materials such as samarium-cobalt (SmCo), neodymium-iron-boron (NdFeB), or nickel-cobalt (NiCo). Other magnetic materials may be used as the circumstances demand. Eight magnets made of SmCo, for example, may hold a weight of about 400 pounds. This may be compared with the weight of a typical carrier head 100 which may weigh about 20 pounds. The magnet plates can be permanent magnets.

Figure 7A:
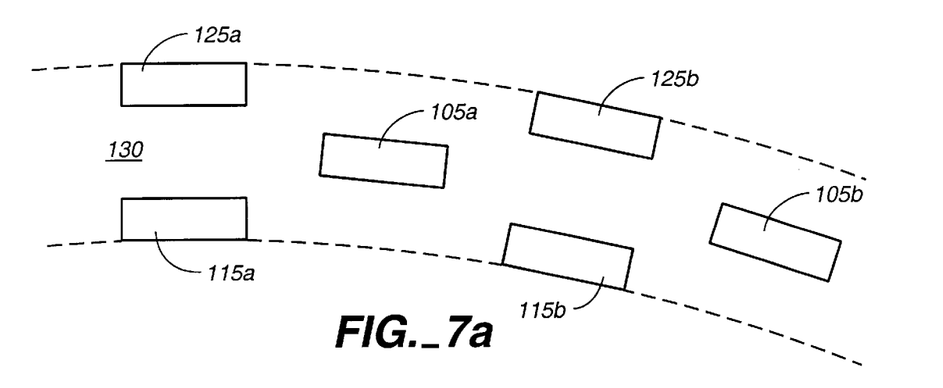
FIG. 7(a) is a top plan view of a magnetic plate in the unlocked configuration.

The installation of carrier head 100 involves mounting carrier head flange 101 onto flange 98. As shown in FIG. 7(a), this is accomplished relatively simply by first moving carrier head flange 101 to a position such that plates 115a and 125a are at a position circumferentially between plates 105a, referred to here as the "unlocked" position. Carrier head flange 101 can then be rotated to aposition such that each plate 105a is between a set of magnetic plates 115a and 125a, referred to here as the "locked" position and shown in FIG. 7(b). For purposes of safety, a spring return may be provided (not shown) to maintain magnetic plates 115a and 125a in the locked position. The above discussion also holds, of course, for plates 105b, 115b, 125b, and so on.

Figure 7B:
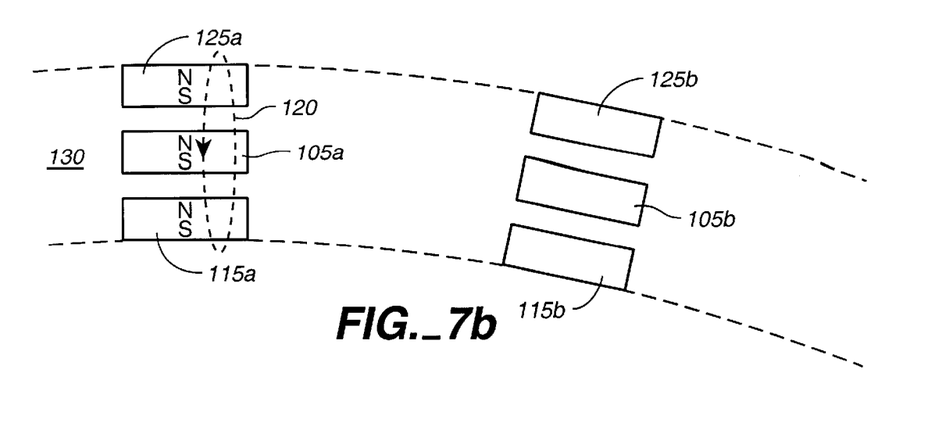
FIG. 7(b) is a top plan view of a magnetic plate in the locked configuration.

In FIG. 7(b), plates 105a and 105b, inner plates 115a and 115b, and outer plates 125a and 125b are shown in the locked position. Each plate has a magnetization which is normal to its face, resulting in a north pole on one face of the plate and a south pole on the opposite face. Plate 105a is shown with a north pole denoted by "N" and a south pole denoted by "S." Magnetic plates 115a and 125a also are oriented such that they have a north pole "N" and a south pole "S" as shown. In this configuration, a magnetic circuit is formed, one field line 120 of which is shown as a dotted line. Another view of the field line is shown in FIG. 5. As this is a stable configuration, the magnetically coupled plates resist changes to the configuration. This provides the force required to attach carrier head flange 101 to system flange 98.

A movement of carrier head flange 101 into or out of the plane of FIG. 7(b), which corresponds to a downward force on carrier head flange 101, would not significantly change field line 120 until the plates start to separate. Any such downward force on carrier head flange 101 tends to break the closed magnetic circuit, and is thus resisted. Gravity, of course, is one such force.

Figure 8A:
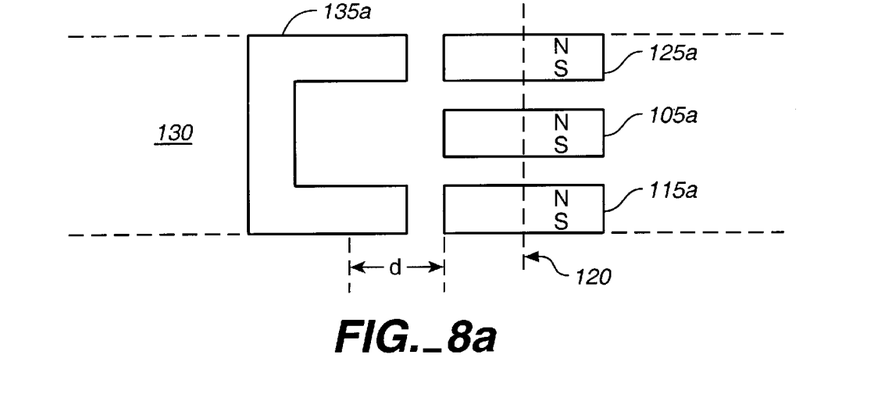
FIG. 8(a) is a top plan view of a magnetic plate and shunt configuration in the locked configuration.

A circumferential rotation may be used to disengage carrier head flange 101 from flange 98. Referring to FIG. 8(a), a plate 105a is shown in locked position between plates 115a and 125a. A plurality of generally "U"-shaped shunts 135 can be provided on annulus 130—one for each set of plates 115a and 125a. When carrier head flange 101 is rotated to the unlocked position, plate 105a is rotated into a "U" formed by a shunt 135a. Shunt 135a effectively pulls the field lines, such as field line 120, away from the magnetic circuit formed by plate 105a, inner plate 115a, outer plate 125a and annulus 130. This magnetic circuit is thus broken. In its place is another magnetic circuit; this is the circuit formed by plate 105a and shunt 135a. The field lines for this magnetic circuit, such as field line 122, are perpendicular to the direction of previous field lines such as field line 120. The forces involved are likewise perpendicular. In this unlocked position, carrier head flange 101 may be moved away from system flange 98 in a direction parallel to drive shaft 74 and thus removed for repair.

Figure 8B:
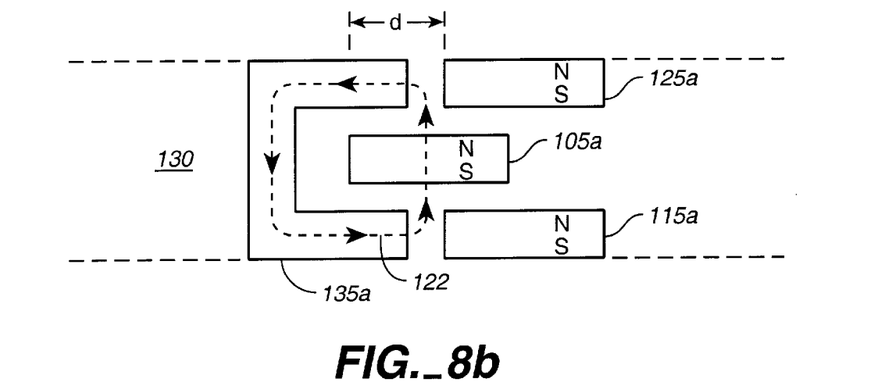
FIG. 8(b) is a top plan view of a magnetic plate and shunt configuration in the unlocked configuration, showing a magnetic field line.

The circumferential distance between the locked and the unlocked position is shown in FIGS. 8(a) and 8(b) as "d". This distance may be, for example, between about 0.25 to 0.5 inches, corresponding to an angle of rotation of the carrier head between about 10 and 20 degrees, such as about 15°.

Figure 9:
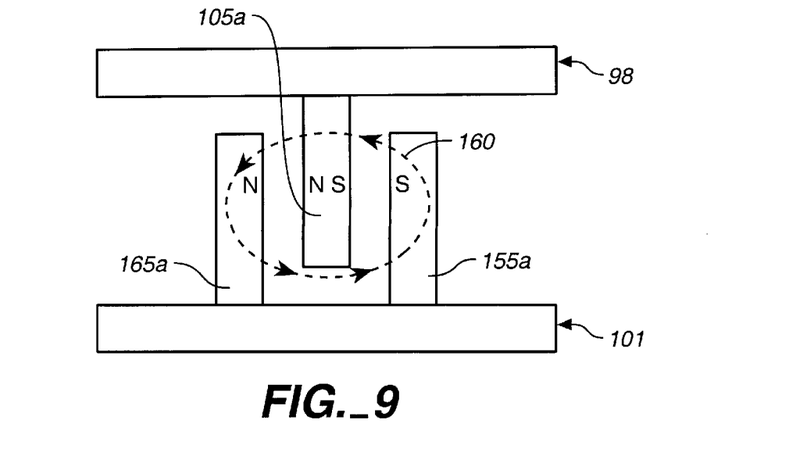
FIG. 9 is a cross-sectional view of a magnetic plate system showing a magnetic field line.

FIG. 9 shows another embodiment, in which plates 115a and 125a are replaced by soft ferromagnetic material plates 155a and 165a. Plates 155a and 165a have no permanent magnetic moment, but rather have magnetic moments induced by the magnetic field of plate 105a. As shown in FIG. 9, the left face of plate 105a has a north pole which induces a north pole on the right side of plate 165a. The right face of plate 105a has a south pole which induces a south pole on the left side of plate 155a. This makes the field line 160 run in a direction opposite that of field line 120 of FIG. 5. The remainder of the operation of this embodiment is similar to that described above.

Figure 10A:
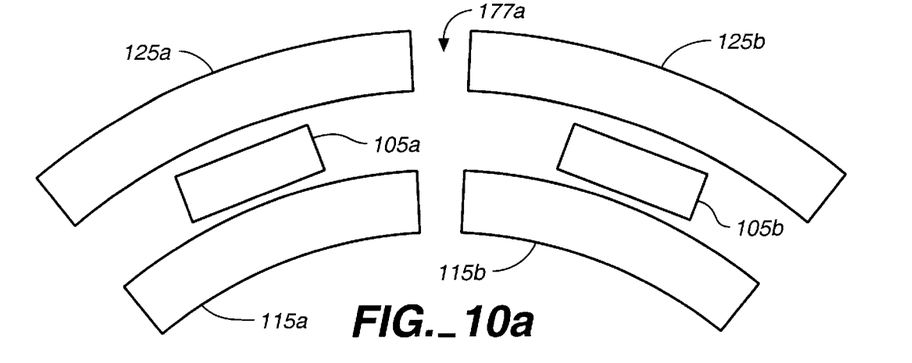
FIG. 10(a) is a top plan view of a magnetic plate in the locked configuration.
Figure 10B:
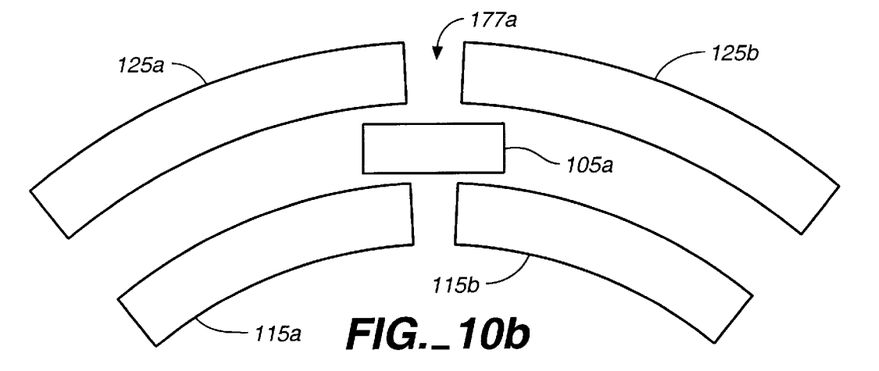
FIG. 10(b) is a top plan view of a magnetic plate in the unlocked configuration.

In yet another embodiment, referring to FIGS. 10(a) and 10(b), a magnetic circuit is formed by plate 105a, inner plate 115a and outer plate 125a. Plates 115a and 125a may or may not have a permanent magnetic moment. Shunts need not be provided in this embodiment, however. Breaks 177a serve to separate circumferentialy neighboring plates—e.g., plate 125a from 125b and plate 115a from 115b.

To couple carrier head flange 101 to system flange 98, plates 105a are moved such that they are between breaks 177a. That is, plates 105a are moved such that they are not co-radial with breaks 177a. To disengage carrier head flange 101 in this embodiment, plate 105a is moved such that it is co-radial with break 177a. Because of break 177a, a complete magnetic circuit cannot be formed. Carrier head flange 101 is magnetically coupled weakly, if at all, to system flange 98. Thus, carrier head flange 101 effectively is magnetically decoupled and may be removed and repaired easily.

One way of installing plate 105a is to provide plate 105a with a radial orientation of its poles opposite to the radial orientation of the poles of plate 105b. In the same way, plate 105a may have a radial orientation of its poles the same as that of plate 105c. In other words, every other magnetic plate may have the same radial direction or orientation of its magnetization.

Figure 11:
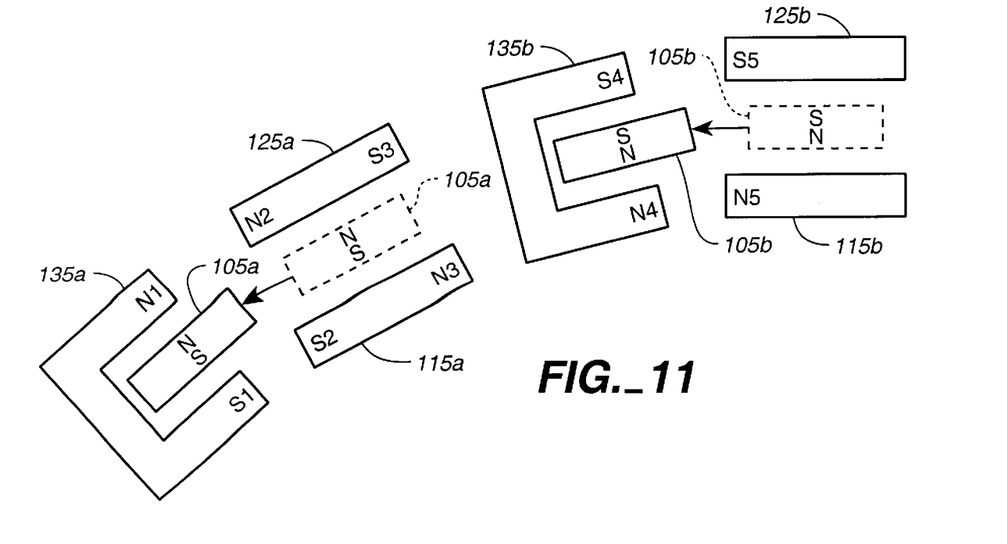
FIG. 11 is a top plan view of a magnetic plate and shunt configuration having alternating polarity plates in the unlocked configuration.

This may be particularly advantageous in cases where plates 115a and 125a have no permanent magnetic moment and in addition where shunt 135a is used. In this situation, referring to FIG. 11, first plate 105a has been moved into the unlocked positions inside "U"-shaped shunt 135a. On the arm of shunt 135a opposite the north pole face of plate 105a, a north pole is induced. A similar effect occurs with the south pole. These induced poles are shown in FIG. 11 as N1 and S1. N1 and S1 in turn induce corresponding magnetic poles in the portions of plates 115a and 125a nearest these poles. In particular, N1 induces N2 and S1 induces S2. Since plate 105b has a polarity opposite that of plate 105a, the former induces poles S4 and N4 which in turn induce S5 in plate 125b and N5 in plate 115b.

Fringing fields from poles S3 and S4 will at least partially affect the circuit formed by plate 105b and shunt 135b. In the orientation shown, poles S3 and N3 will "help" the magnetic circuit in the sense of not impeding the field lines (if poles S3 and N3 were switched, their fringing fields would undesirably impede the field lines). Therefore, orienting first plurality plates 105 such that adjacent plates have opposite polarities provides a convenient way of stabilizing the unlocked configuration.

The present invention has been described in terms of specific embodiments. The invention however, is not limited to the embodiments depicted and described. Rather, the scope of the invention is defined by the appended claims.

What is claimed is:

1. A carrier head assembly, comprising:
a system flange connectable to a drive shaft, said system flange including a first plurality of magnetic plates;
a carrier head flange including a second plurality of magnetic plates, said second plurality of magnetic plates generally facing said first plurality of magnetic plates, and said second plurality of magnetic plates magnetically engaging said first plurality of magnetic plates to magnetically couple said carrier head flange to said system flange; and
a generally flat substrate mounting surface coupled to said carrier head flange to hold a substrate.

2. A carrier head assembly, comprising:
a drive shaft;
a system flange connected to said drive shaft, said system flange including a first plurality of magnetic plates having side surfaces and extending outward form said system flange, said first plurality of magnetic plates generally arranged annularly about said drive shaft; and
a carrier head flange including a second plurality of magnetic plates having side surfaces and extending from said carrier head flange toward said system flange, said second plurality of magnetic plates generally arranged annularly about said drive shaft, said side surfaces of said second plurality of magnetic plates magnetically engaging said side surfaces of said first plurality of magnetic plates to magnetically couple said carrier head flange to said system flange.

3. The carrier head assembly of claim 2, wherein said second plurality of magnetic platens includes a plurality of inner plates and a plurality of outer plates, and the carrier head assembly further comprises an annulus joining said inner plates to said outer plates, and wherein a respective one of said inner plates, a respective one of said outer plates, and the annulus joining said respective inner plate to said respective outer plate generally form a "U"-shaped configuration.

4. The carrier head assembly of claim 2, further comprising a plurality of shunts on said carrier head flange positioned Generally adjacent to said second plurality of magnetic plates, such that when said carrier head flange is rotated relative to said system flange, said first plurality of magnetic plates magnetically engages said plurality of shunts to form a magnetic circuit, such that said system flange is magnetically decoupled from said carrier head flange.

5. The carrier head assembly of claim 2, further comprising a plurality of shunts mounted to said system flange positioned generally adjacent to said first plurality of magnetic plates, such that when said carrier head flange is rotated relative to said system flange, said second plurality of magnetic plates magnetically engages said plurality of shunts to form a magnetic circuit, such that said system flange is magnetically decoupled from said carrier head flange.

6. The carrier head assembly of claim 2, wherein each of said first and second plurality of magnetic plates comprise a partially soft magnetic material.

7. The carrier head assembly of claim 6, wherein said partially soft magnetic material is selected from the group consisting of samarium-cobalt, neodymium-iron-boron, or nickel cobalt.

8. The carrier head assembly of claim 2, wherein each of said first plurality of magnetic plates has a radial direction of magnetization opposite to that of its neighboring magnetic plates.

9. A carrier head assembly, comprising:
a drive shaft;
a system flange connected to and approximately concentric with said drive shaft, said system flange including a first plurality of magnetic plates arranged in an approximately circular manner;
a carrier head flange including a second plurality of magnetic plates, said second plurality of magnetic plates generally facing said first plurality of magnetic plates, said second plurality of magnetic plates further including an inner plurality of magnetic plates and an outer plurality of magnetic plates, said inner and outer pluralities of magnetic plates being equal in number, and wherein each of said inner plurality of magnetic plates is radially separated from a corresponding one of said outer plurality of magnetic plates, such that said second plurality of magnetic plates magnetically engages said first plurality of magnetic plates to magnetically couple said carrier head flange to said system flange.

10. The carrier head assembly of claim 9, further comprising a plurality of shunts mounted to said carrier head flange and positioned generally adjacent to said second plurality of magnetic plates, such that when said carrier head flange is rotated relative to said system flange, said first plurality of magnetic plates magnetically engages said plurality of shunts to form a magnetic circuit, such that said system flange is magnetically decoupled from said carrier head flange.

11. The carrier head assembly of claim 10, wherein a number of said inner plurality of magnetic plates, a number of said outer plurality of magnetic plates, a number of said first plurality of magnetic plates, and a number of shunts are equal.

12. The carrier head assembly of claim 11, wherein the number of said first plurality of magnetic plates is eight.

13. The carrier head assembly of claim 9, wherein each of said first and second plurality of magnetic plates comprise a partially soft magnetic material.

14. The carrier head assembly of claim 13, wherein said partially soft magnetic alloy is selected from the group consisting of samarium-cobalt, neodymium-iron-boron, or nickel cobalt.

15. The carrier head assembly of claim 9, wherein each of said first plurality of magnetic plates or said second plurality of magnetic plates has a radial direction of magnetization opposite to that of its circumferentially neighboring magnetic plates.

16. A carrier head assembly, comprising:
a drive shaft;
a system flange connected to and approximately concentric with said drive shaft, said system flange including a first plurality of magnetic plates;
a carrier head flange including a second plurality of magnetic plates generally facing said first plurality of magnetic plates;
said second plurality of magnetic plates including an inner plurality of magnetic plates and an outer plurality of magnetic plates, said inner and outer pluralities of magnetic plates each having a generally circular shape, said inner plurality of magnetic plates radially separated from said outer plurality of magnetic plates;
each of said inner and outer pluralities of magnetic plates defining breaks between each magnetic plate and the circumferentially neighboring magnetic plates; and
such that said second plurality of magnetic plates magnetically engages said first plurality of magnetic plates to couple said carrier head flange to said system flange when each of said first plurality of magnetic plates is between said breaks.

17. The carrier head assembly of claim 16, wherein when each of said first plurality of magnetic plates is co-radial with a break, said system flange is magnetically decoupled from said carrier head flange.

18. The carrier head assembly of claim 16, wherein each of said first plurality of magnetic plates has a radial direction of magnetization opposite to that of its neighboring magnetic plates.

19. A method of performing chemical mechanical polishing comprising:

providing a system flange having a first plurality of magnetic plates;

providing a carrier head that includes a carrier head flange having a second plurality of magnetic plates and a generally flat substrate mounting surface coupled to the carrier head flange;

coupling the system flange to the carrier head flange by magnetically engaging the first plurality of magnetic plates with the second plurality of magnetic plates;

placing a substrate onto the substrate mounting surface; and polishing the substrate against a polishing surface.

20. A carrier head assembly, comprising:

a drive shaft;

a system flange connected to said drive shaft, said system flange including a first plurality of magnetic plates;

a carrier head flange including a second plurality of magnetic plates, said second plurality of magnetic plates generally facing said first plurality of magnetic plates, and said second plurality of magnetic plates magnetically engaging said first plurality of magnetic plates to magnetically couple said carrier head flange to said system flange, said second plurality of magnetic plates including a plurality of inner plates and a plurality of outer plates; and an annulus joining said inner plates to said outer plates, wherein a respective one of said inner plates, a respective one of said outer plates, and the annulus joining said respective inner plate to said respective outer plate generally form a "U"-shaped configuration.

21. A carrier head assembly, comprising:

a drive shaft;

a system flange connected to said drive shaft, said system flange including a first plurality of magnetic plates;

a carrier head flange including a second plurality of magnetic plates, said second plurality of magnetic plates generally facing said first plurality of magnetic plates, and said second plurality of magnetic plates magnetically engaging said first plurality of magnetic plates to magnetically couple said carrier head flange to said system flange; and a plurality of shunts on said carrier head flange and positioned generally adjacent to said second plurality of magnetic plates, such that when said carrier head flange is rotated relative to said system flange, said first plurality of magnetic plates magnetically engages said plurality of shunts to form a magnetic circuit, such that said system flange is magnetically decoupled from said carrier head flange.

22. A carrier head assembly, comprising:

a system flange connectable to a drive shaft, said system flange including a first plurality of magnets;

a carrier head flange including a second plurality of magnets, said second plurality of magnets positioned to magnetically engage said first plurality of magnets to magnetically couple said carrier head flange to said system flange; and a generally flat substrate mounting surface coupled to said carrier head flange to hold a substrate.

* * * * *